May 10, 1938.　　　　G. LAUBE ET AL　　　　2,116,704

LENS MOUNT

Filed Sept. 26, 1936

INVENTORS
Grover Laube
Charles M. Miller
BY
R. L. Gunn  ATTORNEY

Patented May 10, 1938

2,116,704

UNITED STATES PATENT OFFICE 2,116,704

LENS MOUNT

Grover Laube and Charles Melvin Miller, Los Angeles, Calif., assignors to Twentieth Century-Fox Film Corporation, Los Angeles, Calif., a corporation of New York Application September 26, 1936, Serial No. 102,715

7 Claims. (Cl. 88—24)

This invention relates to lens mounts and deals with a mount for objective lenses wherein novel means is incorporated for focusing the lens.

The principal object of this invention is to provide a lens mount having means for focusing an objective lens, wherein the objective is moved on its principal axis in a rectilinear non-rotating movement.

Another object is to provide a lens mount having anti-friction bearings for supporting the movement of the lens.

A further object is to provide a novel means for moving the objective.

Still another object is to provide a lens mount wherein the over-all movement of the operating means for focusing may be standardized for lenses of different focal lengths.

A still further object is to provide a lens mount characterized by precision and durability.

And another object is to provide a lens mount of the character described that lends itself readily to ease and economy in manufacturing.

Other objects and advantages will appear as the description proceeds in conjunction with the drawing in which.

Figure 1:
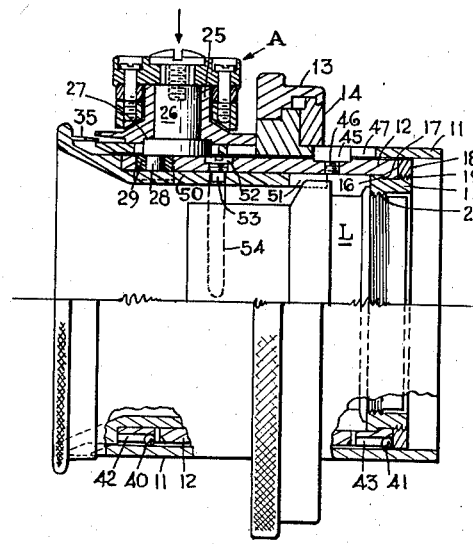
Figure 1 is a view of our mount construction shown partly in elevation and partly in section.

Referring to the drawing and particularly to Figure 1, it will be observed that our invention comprises a supporting sleeve 11, having an objective carrying sleeve 12 movably mounted therein. The supporting sleeve 11 is adapted to be mounted on a conventional motion picture camera, not shown, and for this purpose is provided with a turnable ring 13 arranged to detachably engage a member 14 mounted on the camera. This will be recognized as the common means of mounting a lens on a camera and will not be further described. The objective carrying sleeve 12 is equipped for carrying a lens L in a manner to allow initial setting of the lens for the focal starting point and as shown, comprises an annular ring 15 having an outwardly extending shoulder 16 arranged to engage an inwardly extending shoulder 17 on the supporting sleeve 12.

The ring 15 is held in place by another ring 18 screw threadedly mounted thereon by screw threads 19 and carries internal threads 20 adapted to receive the conventional screw threaded end of the lens L. In cases where adjustment is needed for initial mounting of the lens L, a shim of the required thickness may be used between the shoulders 16 and 17.

Figure 3:
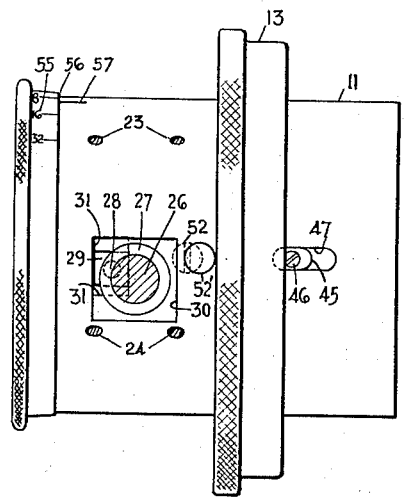
Figure 3 is a view similar to Figure 2 with the operating knob removed and is taken on line 3—3 of Figure 4.
Figure 2:
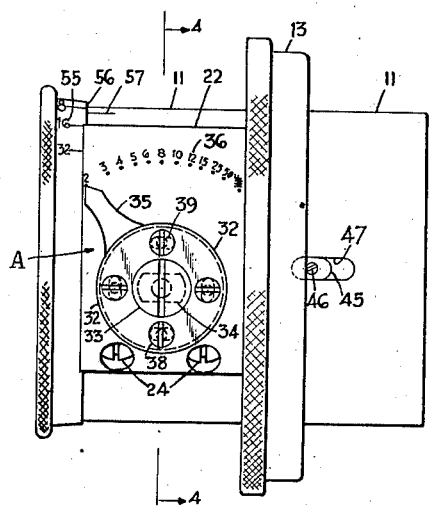
Figure 2 is a side elevation of the mount taken in the direction of the arrow in Figure 1.
Figure 4:
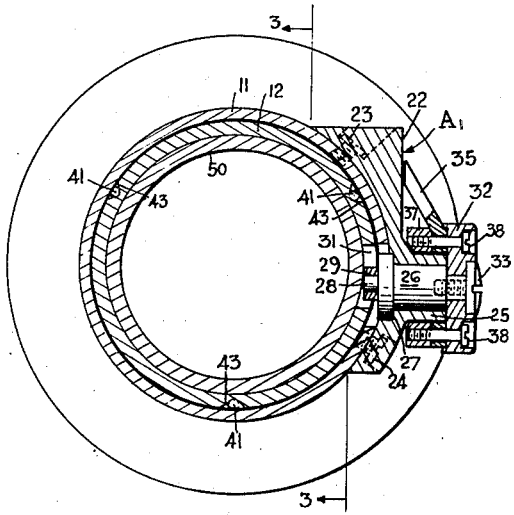
Figure 4 is a cross section taken on line 4—4 of Figure 2.

The means for moving the lens carrying sleeve 12 and focusing the lens L is designated A in its entirety. As before stated, it is one of the objects of this invention to provide means for this purpose that moves the lens in a non-rotating rectilinear movement. As shown, this consists of a bracket 22 mounted on the sleeve 11 by screws 23 and 24. The bracket 22 is formed with a hub 25 adapted to receive a rotatable shaft 26. On the inner end of the shaft 26 we provide an annular shoulder 27 that is arranged to bear against a recess cut in the bracket 22. The inner face of the shaft 26 carries an eccentric pin 28. On the pin 28 we pivotally mount a block 29. For purposes of assembling this arrangement, the supporting sleeve 11 is formed with an opening 30 large enough to receive the inner end of the shaft 26 and pass the pin 28 and the block 29. When assembled, the block 29 fits into a circumferential slot 31 in the sleeve 12. By referring to Figure 3, it can be seen that rotation of the shaft 26 will force the sleeve 12 to travel longitudinally in the sleeve 11. The means for turning the shaft 26 comprises a knob 32 attached to the shaft by a screw 33. Any suitable means for preventing slippage of the knob on the shaft may be provided, in this instance we have shown the outer end of the shaft 26 turned down and flatted on two sides as illustrated and designated 34 in Figure 2. The knob 32 carries a pointer 35 which may be read against the calibrations 36 for indicating the field distances. Means is provided for slight variation in the setting of the pointer to allow for adjustment of the pointer to the initial calibration. This feature has been incorporated in the means for attaching the pointer to the knob and is best illustrated in Figure 4. Here it can be seen that the pointer 35 is held against the under side of the knob 32 by a ring 37 which in turn is clamped against the pointer body by screws 38. It is to be understood that the pointer 35 is held between the ring 37 and the knob 32 by friction only and that where the screws 38 pass through the body of the pointer, the holes are elongated as shown and designated 39 in Figure 2. This arrangement allows slight rotation of the pointer with respect to the knob by loosening the screws 38 and permits the pointer to be adjusted to the knob for the initial setting of the lens with respect to the calibrations.

Figure 5:
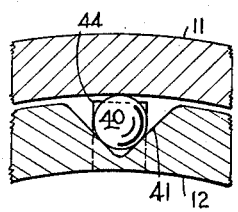
Figure 5 is a cross sectional view showing the arrangement of the anti-friction bearing for supporting the objective lens.
Figure 6:
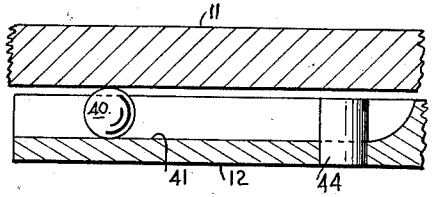
Figure 6 is a longitudinal section of the same.

Another feature of this invention resides in the anti-friction bearing for the lens carrying sleeve in the supporting sleeve. In Figures 1, 5, and 6 we have illustrated this type of bearing. Referring to Figure 1 in the broken away portion, the lens carrying sleeve 12 is supported in the supporting sleeve 11 by means of balls 40 and 41 riding in slots or grooves 42 and 43 respectively in the sleeve 12. It is obvious that the grooves may be formed in either sleeve if more convenient or desirable. By making these balls and grooves a nice fit, the lens carrying sleeve may be precisely mounted in the supporting sleeve and moved with a minimum of friction. In practice, we use three or more of these ball arrangements at each end of the sleeve, circumferentially spaced around the sleeve 12 as shown in Figure 4. Figures 5 and 6 show enlarged views of the ball bearing arrangements and may be considered as an enlarged view of the ball 40. In order to prevent binding or excessive friction at the end of the run of the ball, we recommend a post 44 be installed as shown in Figures 5 and 6. This type of bearing will not prevent rotation of the sleeve 12 in the sleeve 11, consequently we provide a key 45 fixed to the sleeve 12 by a screw 46 or in any other suitable manner and slot the sleeve 11 as shown at 47 to receive the key. The key and slot may be reversed in the sleeves if found to be desirable. With this arrangement, the sleeve 12 may be moved longitudinally in the sleeve 11 with nice precision and a minimum of friction.

The aperture control means comprises a sleeve 50 rotatably mounted in the sleeve 12. The inner end of the sleeve 50 carries a tongue 51 adapted to engage a slot on the periphery of the lens shell. It is to be understood that the sleeve 50 travels with the sleeve 12 and is rotatably held in the sleeve 12 by means of a screw 52 screw threadedly mounted in the sleeve 12 and having a tongue 53 extending into a groove 54 in the sleeve 50. An opening 52' is provided in the sleeve 11 for inserting the screw 52. The outer end of the sleeve 50 is bell shaped for purposes of admitting light. The indicia 55 for indicating the aperture is carried on a flange 56 that extends inwardly over the outer periphery of the sleeve 11 and may be read against a mark 57 on the sleeve 11.

Figure 7:
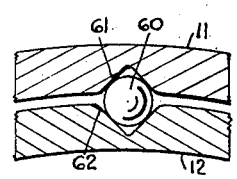
Figure 7 is a cross-sectional view showing another form of the anti-friction bearing.

In Figure 7 we have shown another form of ball bearing for mounting the lens carrying sleeve in the supporting sleeve. In this form we incorporate the means for holding the travelling sleeve against rotation with respect to the supporting sleeve as well as providing an anti-friction bearing for the sleeve. The bearing comprises a ball 60 which works in longitudinal slots 61 and 62 in the supporting sleeve 11 and the lens carrying sleeve 12 respectively. A bearing of this nature will hold the two sleeves against relative rotation and will at the same time furnish an anti-friction support for one sleeve within the other. Our invention includes a bearing of this type.

Having set forth the objects and advantages of our invention together with a description of the same, what we claim is:

1. A lens mount comprising: a supporting sleeve; a lens carrying sleeve having a circumferential slot therein mounted in said supporting sleeve for longitudinal movement; a block slidably mounted in said slot; a bracket mounted on said supporting sleeve; a shaft rotatably mounted in said bracket; an eccentric on said shaft pivotally connected to said block; means for turning said shaft to move said lens carrying sleeve longitudinally with respect to said supporting sleeve, to focus said lens and means for preventing relative rotation of said sleeves.

2. The elements of claim 1 and in addition thereto, a pointer associated with said means for turning the shaft for indicating the focus of said lens.

3. A lens mount comprising: a supporting sleeve; a lens carrying sleeve having a circumferential slot therein mounted in said supporting sleeve for longitudinal movement; a block slidably mounted in said slot; a bracket mounted on said supporting sleeve; a shaft rotatably mounted in said bracket; an eccentric on said shaft pivotally connected to said block; means for turning said shaft to move said lens carrying sleeve longitudinally with respect to said supporting sleeve to focus said lens; means for preventing relative rotation of said sleeves; a pointer associated with the means for turning the shaft for indicating the focus of the lens, and means for adjusting the pointer relative to the turning means for the initial focus of the lens.

4. A lens mount comprising: a supporting sleeve; a lens carrying sleeve having a circumferential slot in the wall thereof slidably mounted within said supporting sleeve; means for holding said sleeves against relative rotation; a block mounted in said slot and adapted to be reciprocated therein; a turnable member mounted upon said supporting sleeve, and means for pivotally connecting said block to an eccentric position on said turnable member.

5. A lens mount comprising: a supporting sleeve; a lens carrying sleeve telescopically mounted within said supporting sleeve, said lens carrying sleeve having a straight sided vertical slot in the wall thereof; means for preventing relative rotation of said sleeves; a block mounted in said slot and adapted to be vertically reciprocated therein; a rotatable member mounted upon said supporting sleeve, and a pin pivotally connecting said block to an eccentric position upon said rotatable member.

6. A lens mount comprising: a supporting sleeve; a lens carrying sleeve slidably mounted within said supporting sleeve, said lens carrying sleeve having a slot in the wall thereof extending substantially transversely to the longitudinal axis of said sleeve; a block slidably mounted within said slot for reciprocal movement therein; a member rotatably mounted upon said supporting sleeve, said member having its axis of rotation substantially perpendicular to the longitudinal axis of said sleeve, and means for pivotally connecting an eccentric position on said member to said block.

7. A lens mount comprising: a supporting sleeve adapted to be mounted upon a camera or the like; a lens carrying sleeve having a circumferential slot therein slidably mounted within said supporting sleeve; means for confining the movement of the said lens carrying sleeve to a longitudinal movement within said supporting sleeve; a turnable member mounted upon said supporting sleeve and extending through said sleeve for operative connection with said lens carrying sleeve; a block slidably mounted within said slot for reciprocal movement, and a pin pivotally connecting said block to an eccentric position upon said turnable member.

GROVER LAUBE.
CHARLES MELVIN MILLER.